Oct. 27, 1964
C. V. OCHS
3,154,774
SELF CONTAINED ELECTRICAL IMPACT INDICATOR
Filed Jan. 28, 1963
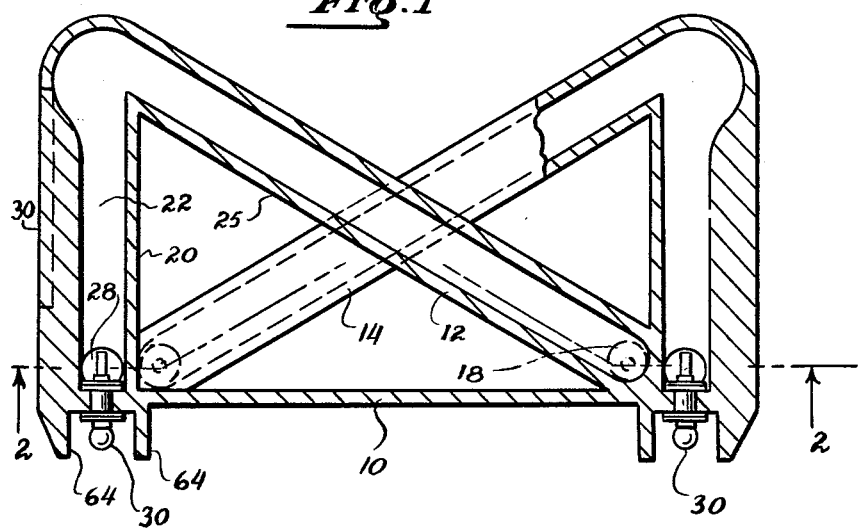
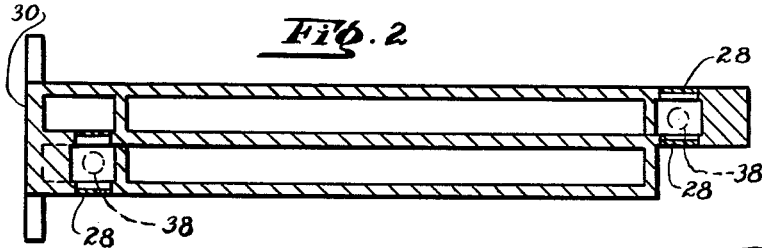
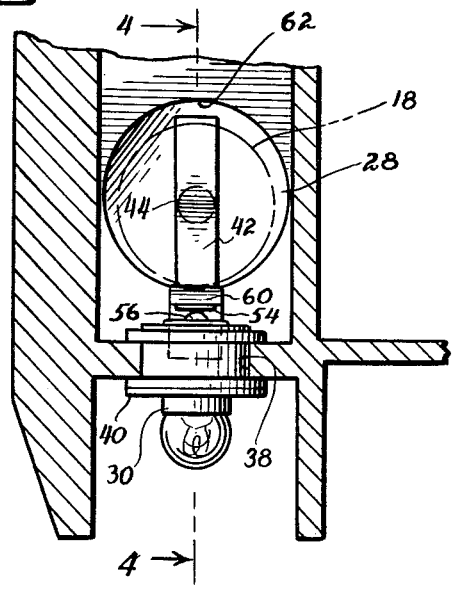
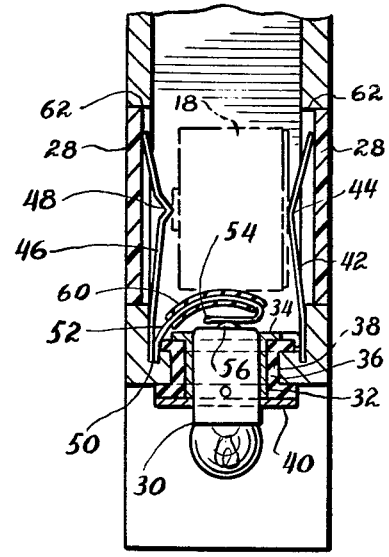
INVENTOR.
CLAIR V. OCHS
BY
Emery Whittemore Sandoe etal
ATTORNEYS United States Patent Office 3,154,774
Patented Oct. 27, 1964

3,154,774
SELF CONTAINED ELECTRICAL IMPACT
INDICATOR
Clair V. Ochs, 174 E. 23rd St., Huntington Station, N.Y.
Filed Jan. 28, 1963, Ser. No. 254,380
4 Claims. (Cl. 340—262)

This invention generally relates to acceleration responsive instruments and, more particularly, relates to an impact indicator which can economically be attached to each car of railroad rolling stock to indicate that the car has been subjected to an impact exceeding a predetermined limit.

One of the major problems in the handling of freight by railroads is the loss and damage to cargo caused by rough handling in transit. In addition to damage of the goods carried, rough handling causes concomitant damage to the rolling stock.

At railroad interchanges, both lines inspect the trains for damage in an effort to assess liability. However, it is usually difficult or impossible to assess structural damage by visual inspection alone. Thus, assessment of damage to the line responsible for rough handling is not a reality and connecting lines are often saddled with repair costs for damage due to another line's handling.

In addition to the out-of-pocket expenses for payment of claims for goods damaged in transit and for repair of damaged rolling equipment, the railroads are faced with administrative expenditures to allocate the damage among transporting roads according to present formulas based on the mileage travelled by the goods and equipment on each sharing line. Thus, if direct assessment of damage were feasible, the administrative costs would be reduced.

For these reasons, it has been desirable to provide means which could be attached to or located in each railroad car to indicate rough handling. In this manner, interchange inspections could be more meaningful in the assignment of liability. Further, if such information were available, it could serve as a valuable tool to railroad management in isolation of specific yards in which such rough handling occurs.

Recording accelerometers have been used. However, such recorders are extremely expensive, thus, precluding the possibility of incorporating a recorder within each unit of rolling equipment. Further, recording accelerometers and equipment of like nature must usually be mounted inside the cars since they would be damaged by exposure to the weather. Inspections of recorders inside cars at interchanges and the like is too time-consuming to be practical.

It is, therefore, the primary object of this invention to provide an economical impact recorder which can be attached to the exterior of each car and which will indicate if the car has been subjected to an impact exceeding a predetermined value.

It is a further object of this invention to provide a recorder which will trip upon handling impacts higher than the preselected value and will indicate the tripped condition by an indicator which is visible both during day and night time hours.

In accordance with these objects, there is provided in a preferred embodiment of this invention an impact indicator assembly consisting of impact indicators for measurement of impacts which exceed a predetermined value in each direction of impact applications along the length of the car.

Each indicator consists of an inclined plane within which is mounted a cylindrical mass. At the upper end of the inclined plane, a vertically extending chute is provided to receive the mass if the impact exceeds the value necessary to cause the mass to roll over the top of the inclined plane.

Thus, if the impact exceeds the predetermined impact as determined by the slope of the inclined plane, the mass will fall into the vertically extending chute. The shaft is provided with a transparent window through which the mass may be seen.

The mass is preferably a cylindrical battery which, in the tripped position, will be electrically coupled to a bulb in the bottom of the chute to light the bulb, providing a visible indication of the tripped condition at night.

Having briefly described this invention, it will be described in greater detail along with other objects and advantages in the following detailed description, which may best be understood by reference to the accompanying drawings, of which:

FIG. 1 is a partially sectioned elevation view of an instrument constructed in accordance with the present invention;

FIG. 2 is a sectional view taken along lines 2—2 of FIG. 1;

FIG. 3 is a sectional view of a portion of the apparatus shown in FIG. 1 to enlarged scale; and FIG. 4 is a sectional view taken along lines 4—4 of FIG. 3.

In the figures, there is shown an impact indicator assembly comprising a frame member 10 on which is mounted a first inclined plane section 12 and a second inclined plane section 14. The first and second inclined plane sections are arranged in parallel with the slopes of the sections oppositely inclined to measure impact applied in either direction as indicated by arrow 16. The assembly may then be mounted on a railroad car by bonding one edge thereof to the car wall with the inclined plane sections 12, 14 extending along the car length to record both the existence of impacts and the direction of the impact. The assembly is preferably molded of plastic either by blow molding as an entity or by forming in matching sections bonded together for assembly.

Rollably mounted within each inclined plane section 12, 14 is a cylindrical inertial mass 18. When the instrument is subjected to an impact, as for example, a coupling impact, inertial mass 18 will roll up the associated inclined plane. The height of the wall surface 20 will determine the acceleration characteristics which cause the inertial mass to roll over the top of wall 20 and fall into the chute 22 defined by walls 20 and 24.

When dealing with impact measurements such as for example, during coupling of freight cars, the acceleration is imposed during a relatively short time interval and the height of wall 20 will be primarily determinative of the impact amplitude which will cause the inertial mass 18 to fall into chute 22. For example, it has been determined that, if the relative speed of cars being coupled together is held below four miles an hour, little or no damage can be anticipated. Therefore, particularly in damage analysis, it is desirable to adjust the slope of the inclined plane so that the inertial mass will travel up the inclined plane and fall into chute 22 under impact conditions in which the relative coupling speed exceeds four miles per hour. To prevent vibration, shock, and bounce from adversely influencing the travel of the inertial mass, the top wall 26 is preferably provided to define the travel of the inertial mass. The inclined plane section 14 is constructed in identical fashion to measure impacts in the opposite direction.

For day time use, a transparent window 28 is provided at the bottom of the chute through which the inertial mass 18 is visible. Thus, by simple inspection of the unit, it can be determined whether or not the unit has been tripped. Thus, for example, the unit can be affixed to a freight car by cementing the surface 30 to the end of the car by an epoxy resin or the like, and at transfer points and other inspection points, the indicator assembly could be inspected to determine if the car had been subjected to impacts in excess of the predetermined limits. This information would be extremely valuable in the allocation of damage responsibility between carriers and would enable analysis of crew performance over the sections of road traversed by each carrier.

Since such transfers and inspections are often undertaken at night and since inspection of the recorders for practical operation must not require time-consuming, detailed inspection, I have found it advisable to construct the inertial mass as a cylindrical battery having long shelf life and long operating life. A light bulb 30 which may conveniently be of the bayonet type is mounted in the bottom of the chute 22. The bulb is preferably soldered directly to a sleeve 32 having a shoulder 34 formed thereon. A rubber grommet 36 may be installed over the sleeve and the entire assembly inserted in the aperture 38 in the chute 22. The sleeve may then be spun as at 40 to bolt the assembly in place. In this manner, the assembly is shock mounted.

A ground contact 42 is coupled to the sleeve 34 and, preferably, is integrally formed therewith. The contact extends into slot 50 and is mounted therein by bonding with a compound such as an epoxy resin. The contact 42 is preferably formed of material having spring characteristics such as the conventional beryllium copper alloys used for electrical contacts and is bent at 44 to provide an outwardly bowed section. In this manner, contact with the case of the battery 18 is ensured without requiring tight dimensional precision. Similarly, a positive contact 46 is constructed having an outwardly extending contact portion 48. This contact is inserted within a slot 50 and may be bonded therein as by an epoxy resin. Contact with the battery is made through a lead 52 which is coupled to contact 46 and is bent in a substantially U-shaped section having a contact arm 54 in electrical and mechanical contact with the positive pole 56 of the bulb. A latex rubber insulation 60 may be sprayed on top of the contact portion 52 to insulate this contact from the battery case. By this method of forming a positive coupling, there is provided a resilient mechanical seating for the battery 18, preventing the application of severe shock to the bulb 30 when the battery falls in the chute 22.

The battery is preferably a small cylindrical battery having extended shelf life and long operating life, as for example, the battery disclosed in Patents 2,422,045, 2,542,575, 2,481,539, 2,636,062 and 2,712,565. Commercially available batteries have dimension of approximately ¾-in. in height and 1-in. in diameter and will operate a bulb for a twenty-four hour period.

Since the interval between transfers and inspections rarely exceeds 18 hours, such operating life is ample for railroad purposes.

Thus, the indicator will warn that the car to which it is attached has been subjected to an impact exceeding a predetermined limit such as a relative coupling velocity of four miles per hour in a form which can be readily observed both during the day time and night. These indications have been provided in a form which can be readily checked by inspection crews from a distance not requiring that the inspection crew observe the indicator in detailed inspection. The projecting skirt 64 protects the bulb against both mechanical damage and exposure to atmospheric conditions.

The indicators are not resettable due to the exhaustion of the battery and, due to the simple and economical construction, it is less costly to replace the entire indicator than to attempt to replace batteries and reset the indicator.

This invention may be variously modified and embodied within the scope of the subjoined claims.

What is claimed is:

1. An impact indicator to indicate when it has been subjected to an impact exceeding a predetermined magnitude, which comprises at least one inclined plane, a vertically disposed chute extending downwardly from the top of said inclined plane, a cylindrical battery having a central positive terminal and the case of which serves as a negative terminal, said cylindrical battery being revolvably mounted as an inertial mass for movement on the surface of said inclined plane, the height of said inclined plane being dimensioned so that said battery will roll up the inclined plane and fall into said chute if the impact exceeds said predetermined magnitude, an electric bulb having a positive and negative terminal mounted in the base of said indicator and means to couple said battery to said bulb terminals to energize said bulb when said battery falls into said chute, thereby to provide a visual indication of the presence of said battery within said chute.

2. An impact indicator in accordance with claim 1 which includes a second inclined plane disposed parallel to said first inclined plane, the slope of said second inclined plane being opposite to the slope of the one inclined plane so as to enable the indication of impacts in opposite directions.

3. An impact indicator in accordance with claim 1 which includes a transparent window mounted at the bottom of said chute through which said battery may be observed.

4. A recording indicator in accordance with claim 1 in which said contact means comprises a sleeve coupled to the base of said bulb and a vertically extending spring contact to engage the case of said battery as it falls into said chute, a positive contact coupled to the positive terminal of said bulb and positioned to engage the positive terminal of said battery as it falls into said chute.

References Cited in the file of this patent

UNITED STATES PATENTS

| 1,842,384 | Blanchard | Jan. 26, 1932 |
| 2,068,315 | Erich | Jan. 19, 1937 |

FOREIGN PATENTS

| 236,333 | Switzerland | Sept. 17, 1945 |
| 131,866 | Australia | Mar. 21, 1949 |